US007899817B2

(12) United States Patent
Stern et al.

(10) Patent No.: US 7,899,817 B2
(45) Date of Patent: Mar. 1, 2011

(54) SAFE MODE FOR INVERSE QUERY EVALUATIONS

(75) Inventors: Aaron A. Stern, Bellevue, WA (US); Pompiliu Diplan, Seattle, WA (US); Geary L. Eppley, Carnation, WA (US); Umesh Madan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 179 days.

(21) Appl. No.: 11/245,322

(22) Filed: Oct. 5, 2005

(65) Prior Publication Data

US 2007/0078829 A1 Apr. 5, 2007

(51) Int. Cl.
*G06F 7/00* (2006.01)
*G06F 11/00* (2006.01)

(52) U.S. Cl. .................. 707/731; 707/713; 707/722; 707/758; 707/781; 726/22; 726/26

(58) Field of Classification Search ............ 707/3, 707/4, 5, 6, 2, 102, 203, 100, 10, 999.003, 707/999.004, 706, 713, 722, 758, 781; 715/255–272, 715/210; 717/131; 706/56; 726/22, 26
See application file for complete search history.

(56) References Cited

U.S. PATENT DOCUMENTS

| 5,249,262 | A * | 9/1993 | Baule .................. 706/56 |
| 5,432,930 | A * | 7/1995 | Song ................... 707/4 |
| 5,781,432 | A * | 7/1998 | Keeler et al. ........... 700/44 |
| 6,105,023 | A * | 8/2000 | Callan ................. 707/5 |
| 6,847,974 | B2 * | 1/2005 | Wachtel ............... 707/101 |
| 7,017,016 | B2 * | 3/2006 | Chujo et al. .......... 711/147 |
| 7,031,958 | B2 * | 4/2006 | Santosuosso .......... 707/3 |
| 7,047,242 | B1 * | 5/2006 | Ponte ................ 707/10 |
| 2002/0112061 | A1 | 8/2002 | Shih et al. ........... 709/229 |
| 2003/0055814 | A1 * | 3/2003 | Chen et al. ........... 707/3 |
| 2003/0163285 | A1 | 8/2003 | Nakamura et al. ...... 702/179 |
| 2004/0010752 | A1 | 1/2004 | Chan et al. ........... 715/513 |

(Continued)

OTHER PUBLICATIONS

Neeraj Bajaj, "*Easy and Efficient XML Processing: Upgrade to JAXP 1.3*," Sun Microsystems, Inc., Oct. 11, 2005, *available at* http://www.tarari.com/PDF/Tarari_RAX4_ProductBrief.pdf (PDF enclosed entitled "Article 1," 13 pages).

(Continued)

*Primary Examiner*—Debbie Le
*Assistant Examiner*—Bao G Tran
(74) *Attorney, Agent, or Firm*—Workman Nydegger

(57) ABSTRACT

Embodiments herein prevent or mitigate attacks on inverse query engines by providing safe mode routines that allow for the acceptance of third party messages and/or query expressions, as well as prevent trusted sources from accidental attacks. The mitigations fall into two categories: compile-time and runtime. Compile-time mitigations prevent query expressions from being accepted and compiled that are susceptible to known attacks. For example, the complexity of query expressions may be limited to functions with linear runtimes; constant memory usage; or ones that do not create large strings. Further, language constructs for the criteria in the query expression may not allow for nested predicates complexities. Runtime mitigations, on the other hand, monitor the data size and processing lengths of messages against the various query expressions. If these runtime quotas are exceeded, an exception or other violation indication may be thrown (e.g., abort), deeming the evaluation as under attack.

8 Claims, 3 Drawing Sheets

U.S. PATENT DOCUMENTS

| | | | |
|---|---|---|---|
| 2004/0060007 A1 | 3/2004 | Gottlob et al. | 715/513 |
| 2004/0068487 A1 | 4/2004 | Barton et al. | 707/3 |
| 2004/0172599 A1 | 9/2004 | Calahan | 715/513 |
| 2004/0193586 A1* | 9/2004 | Sashida et al. | 707/3 |
| 2004/0261019 A1 | 12/2004 | Imamura et al. | 715/513 |
| 2005/0091196 A1* | 4/2005 | Day et al. | 707/3 |
| 2005/0097084 A1 | 5/2005 | Balmin et al. | 707/3 |
| 2005/0165754 A1* | 7/2005 | Valliappan et al. | 707/3 |
| 2005/0177570 A1* | 8/2005 | Dutta et al. | 707/9 |
| 2005/0187906 A1* | 8/2005 | Madan et al. | 707/3 |
| 2005/0193023 A1* | 9/2005 | Ismail | 707/200 |
| 2005/0203957 A1 | 9/2005 | Wang et al. | 707/104.1 |
| 2005/0228768 A1 | 10/2005 | Thusoo et al. | 707/1 |
| 2005/0257201 A1 | 11/2005 | Rose et al. | 717/136 |
| 2006/0005122 A1 | 1/2006 | Lemoine | 715/513 |
| 2006/0005148 A1* | 1/2006 | Cheng et al. | 715/808 |
| 2006/0020631 A1 | 1/2006 | Cheong Wan et al. | 707/104.1 |
| 2006/0031233 A1 | 2/2006 | Liu et al. | 707/100 |
| 2006/0150162 A1* | 7/2006 | Mongkolsmai et al. | 717/131 |
| 2006/0173841 A1* | 8/2006 | Bill | 707/6 |
| 2006/0294095 A1* | 12/2006 | Berk et al. | 707/6 |

OTHER PUBLICATIONS

"*Random Acess SML—RAX 4 Content Processor*," Tarari, *available at* http://www.ccd.uab.es/~joaquin/papers/intellcomm05.pdf (PDF enclosed entitled "Article 2," 2 pages).

Garcia, et al., "*Decoupling Components of an Attack Prevention System Using Publish/Subscribe*," University of Barcelona, *available at* http://java.sun.com/developer/technicalArticles/xml/jaxp1-3/ (PDF enclosed entitled "Article3," 11 pages).

* cited by examiner

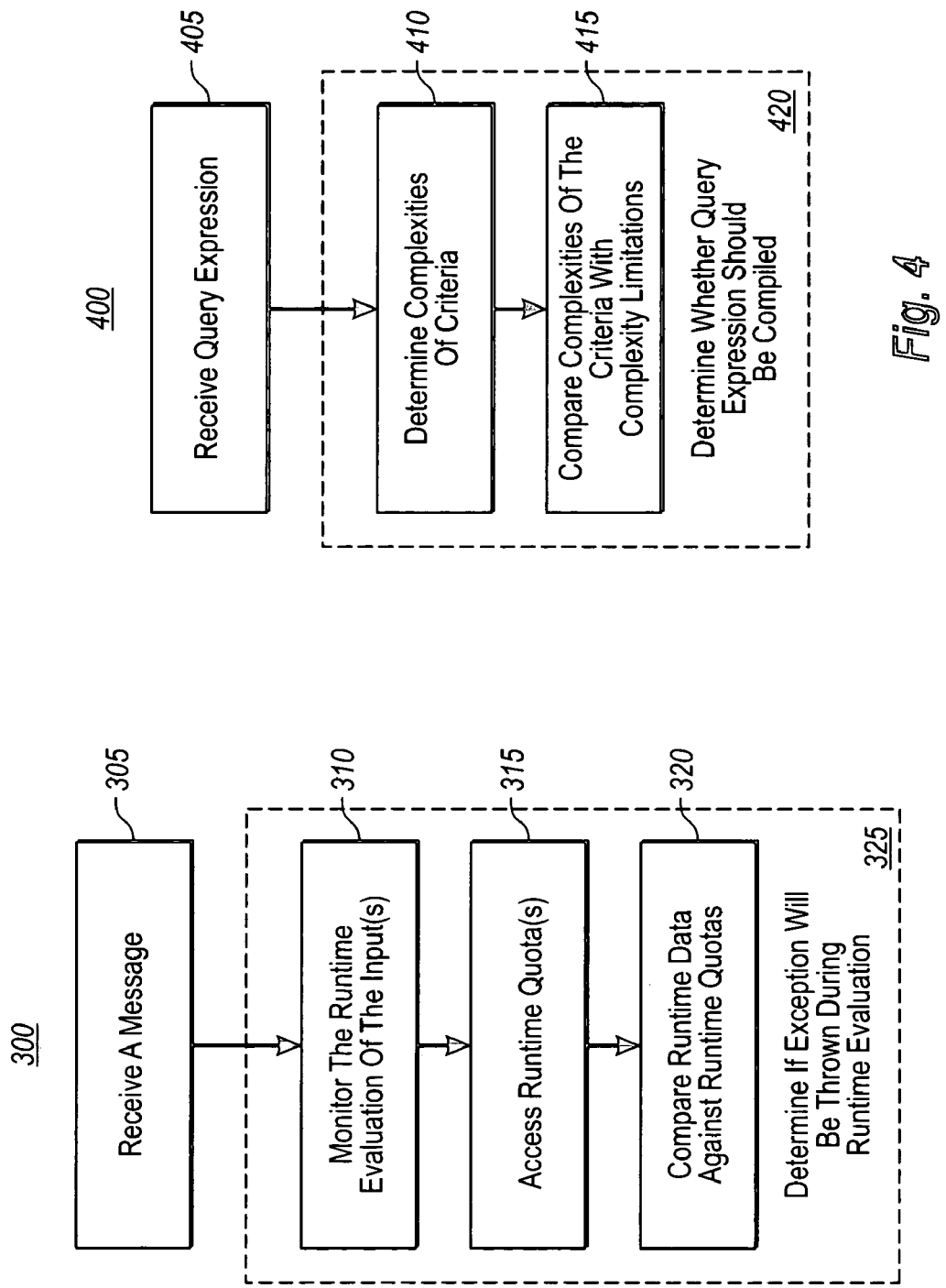

SAFE MODE FOR INVERSE QUERY EVALUATIONS

CROSS-REFERENCE TO RELATED APPLICATIONS

N/A

BACKGROUND

Computing systems—i.e. devices capable of processing electronic data such as computers, telephones, Personal Digital Assistants (PDA), etc.—communicate with other computing systems by exchanging data messages according to a communications protocol that is recognizable by the systems. Such a system utilizes filter engines containing queries that are used to analyze messages that are sent and/or received by the system and to determine if and how the messages will be processed further.

A filter engine may also be called an "inverse query engine." Unlike a database, wherein an input query is tried against a collection of data records, an inverse query engine tries an input against a collection of queries. Each query includes one or more conditions, criteria, or rules that must be satisfied by an input for the query to evaluate to true against the input.

For example, an XPath filter engine is a type of inverse query engine in which the filters are defined using the XPath language. The message bus filter engine matches filters against eXtensible Markup Language (XML) to evaluate which filters return true, and which return false. In one conventional implementation, the XML input may be a Simple Object Access Protocol (SOAP) envelope or other XML document received over a network.

A collection of queries usually takes the form of a tree like data structure, where each node in the tree represents an instruction and each path executed from a root node to a terminating node represents a query expression. Each data structure may include hundreds or thousands of query expression, and each query path may contain several conditions, criteria, or rules. As such, each query path may be seen as a series of instructions that include various functions, language constructs, and/or operations as defined by the inverse query specifications. As messages are received, their inputs are converted into a form conducive to the inverse query engine, which then evaluates the inputs against the instruction paths for each of the query expression.

Such query expressions operate well in confined and properly managed environments (e.g., environments in which only trusted parties use the system and/or the expressions and messages are properly built). These inverse query engines, however, are susceptible to attacks (e.g., Denial of Service (DoS) attacks) in third party settings or when the languages are not properly defined. More specifically, as is the case with most computer languages, there exist pairs of query expressions and inputs that take a long time to process and/or consume large amounts of memory resources. As such, the query system is open to attack whenever it accepts messages and/or query expressions from unreliable third party sources or when the messages or expressions are not well defined. Currently, however, there are few, in any, mechanisms in place that would allow for the mitigation of such attacks.

SUMMARY

The above-identified deficiencies and drawback of current inverse query engines are overcome through example embodiments of the present invention. For example, embodiments described herein provide for mitigating attacks on an inverse query engine by monitoring the runtime evaluation of messages and/or for evaluating the complexity of criteria for query expressions. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example embodiment provides for mitigating attacks on an inverse query engine by comparing monitored runtime data for messages against quota restrictions. In this embodiment, a message is received, which includes input(s) used in runtime evaluation of the message against query expressions for determining if the one or more inputs satisfy the criteria thereof. The runtime evaluation of the inputs is then monitored for collecting runtime data used in determining if the evaluation overly consumes processing time and/or memory resources. Runtime quota(s) are also accessed, which define a threshold of tolerable limits in terms of data size and/or processing lengths. The runtime data is then compared against the runtime quota(s) for determining if an exception will be thrown based on runtime data values that exceed the threshold limits of the runtime quota(s).

Another example embodiment provides for evaluating the reliability of the query expression by comparing complexities of the criteria against acceptable limitations when compiling the query expression in a safe mode. In this embodiment, a query expression is received, which includes criteria for applying against inputs of messages. Prior to compiling the query expression, the complexities of the criteria are determined in terms of criteria functions, language constructs, or both. The complexities of the criteria are then compared with complexity limitation(s) that define the reliability of criteria in terms of execution time, memory consumption, or both. Based on the comparison, it is then determined whether the query expression should be compiled for evaluation against the inputs of the messages.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a flow diagram of a method of mitigating attacks on an inverse query engine in accordance with example embodiments; and FIG. 4 illustrates a flow diagram of a method of evaluating the reliability of query expressions in accordance with example embodiments.

DETAILED DESCRIPTION

Figure 1:
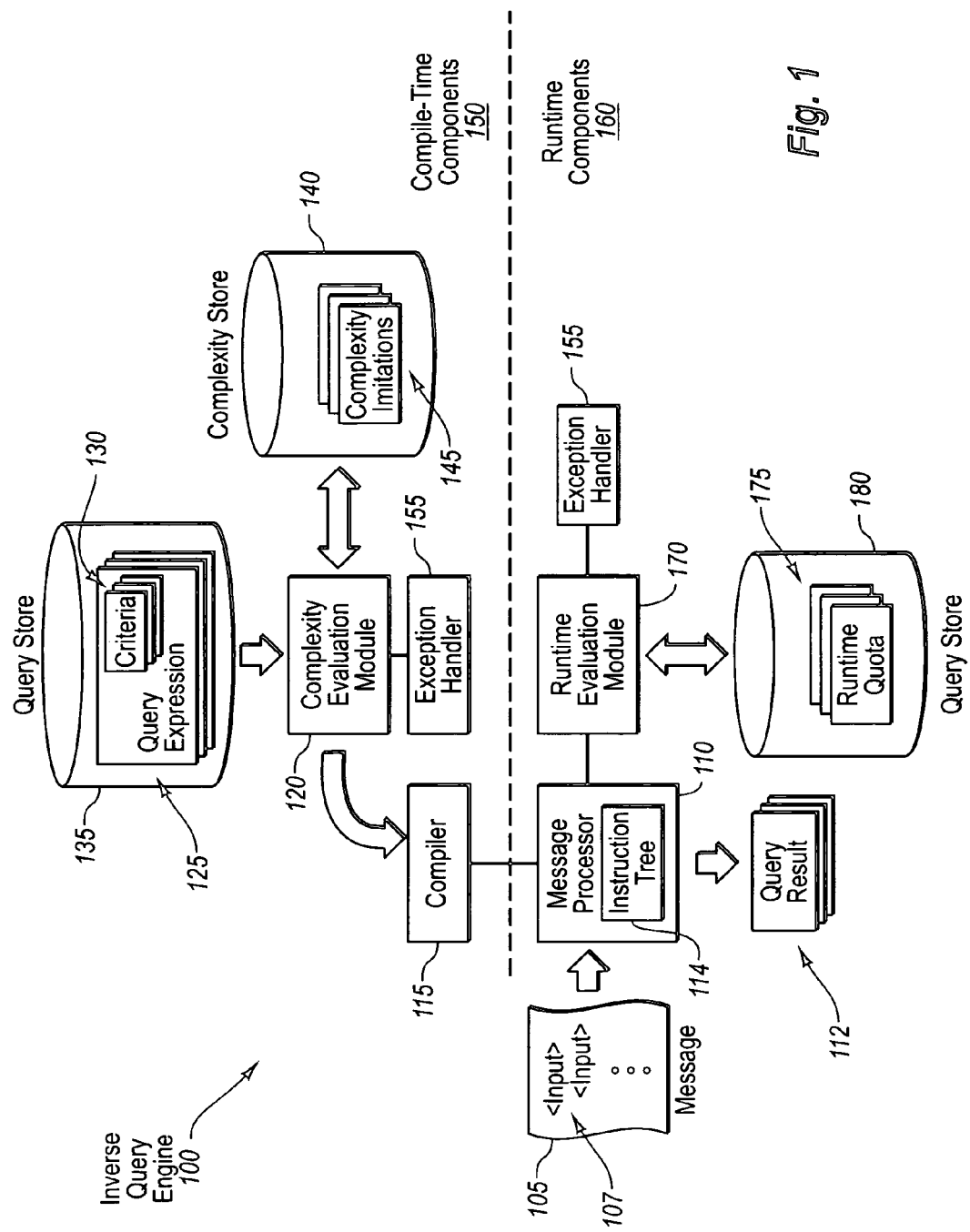
FIG. 1 illustrates an inverse query engine configured to mitigate attacks on the system by monitoring runtime evaluations of messages and evaluating the complexities of query expressions in accordance with example embodiments.

The present invention extends to methods, systems, and computer program products for mitigating attacks on an inverse query engine by monitoring the runtime evaluation of messages and/or for evaluating the complexity of criteria for query expressions. The embodiments of the present invention may comprise a special purpose or general-purpose computer including various computer hardware or modules, as discussed in greater detail below.

As with most computer languages, there exist pairs of query expressions and inputs that overly consume processing time and/or memory resources. Such pairs represent a potential for a DoS attack against inverse query engines (e.g., XPath engine). Embodiments herein prevent or mitigate such attacks by monitoring the runtime processing of message and/or performing analysis on the query expressions prior to compilation. These safe mode routines allow for the acceptance of third party messages and/or query expressions, as well as prevent trusted sources from accidental DoS attacks.

As alluded to above, inverse query engine mitigations fall into two categories: compile-time and runtime. Compile-time mitigations prevent query expressions from being accepted that are susceptible to known attacks. By way of example only, a compile-time mitigation might be identifying and rejecting nested predicates of the form "//*[//*[//*]]]", which is a common example of a query expression that takes a very long time to evaluate. Runtime mitigations, on the other hand, monitor the data size and processing lengths of messages against the various query expressions and throw an exception (e.g., abort) or take some other action once the evaluation has been deemed an attack. An example of a runtime mitigation may be to monitor the total time of the evaluation and abort it once a certain amount of time has elapsed.

As described in greater detail below, however, there are many other ways of identifying and controlling an attack, which are also contemplated herein. In fact, many of the mitigations as presented herein are not strict criteria, but can be adjusted and tuned to change the threshold at which exceptions are raised. For example, increasing the safety mode decreases what the query expression are capable of doing before reaching the threshold. While raising the threshold allows for more powerful query expression, yet also makes the engine more susceptible to attack.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

FIG. 1 illustrates an inverse query engine 100 (e.g., an XPath engine) configured to run and compile in a safe mode in order mitigate the effects of an attack on the system. The following description of FIG. 1 will occasionally refer to the flowchart of FIG. 2 in order to describe various functions or operations performed by modules within FIG. 1. Note that although specific inquires and results of the flowchart in FIG. 2 may occur in a particular order, embodiments describer herein are not limited to such ordering. Further note that although reference may be made to a specific element from FIG. 1 for performing a particular task of FIG. 2, such references are used for illustrative purposes only and are not meant to limit or otherwise narrow the scope of the described embodiments unless explicitly claimed.

As shown in FIG. 1, the query engine 100 is divided into runtime components 160 (below the dashed line) and compile-time components 150 (above the dashed line). Although the components are shown as distinct modules separated into the two categories of components (i.e., runtime 160 and compile-time 150), the present invention is not limited to any particular order or layout of the modules. In fact, the modules and components may be combined in any manner to perform any number of functions; however, the aesthetic layout of the modules has been made for ease in describing various embodiments provided for herein. Accordingly, any specific layout of modules, or any particular reference to a particular module for performing a specific function, are used herein for illustrative purposes only and are not meant to limit or otherwise narrow the scope of embodiments described herein.

In any event, as shown in FIG. 1, inverse query engine 100 accepts messages 105 for evaluation against query expressions 125. When executed, the electronic message 105 may be received over a communication channel, or it may be accessed from memory, storage, or received from any number of input components. In accordance with one embodiment, the message may be received by an unreliable source such as a third party; however, that need not be the case. In another embodiment, the electronic message is a hierarchically-structured document such as an eXtensible Markup Language (XML) document or a Simple Object Access Protocol (SOAP) envelope.

Regardless of the how, where, or from whom, the message 105 is received, the query engine 100 uses message processor 110 to process the inputs 107 of message 105 against query expressions 125, which are typically compiled into an instruction tree 114 to generate query results 112. Although the instruction tree 114 is illustrated schematically as a box in FIG. 1, the instruction tree is actually a hierarchical tree that represents execution paths for a plurality of queries 125. Each node of the instruction tree 114 represents an instruction, and each branch in the instruction tree 114 when executed from a root node to terminating branch node represents a full query expression. Note, however, the instruction tree is not limited to any particular type of data structure. In fact, embodiments described herein may be applicable to any type of hierarchical data structure (e.g., an array) used in any type of inverse query engine 100. As such, any specific type of instruction tree 114 or process for evaluating a message 105 as described herein is used for illustrative purposes only and is not meant to limit or otherwise narrow the scope of embodiments herein described unless explicitly claimed.

Figure 2:
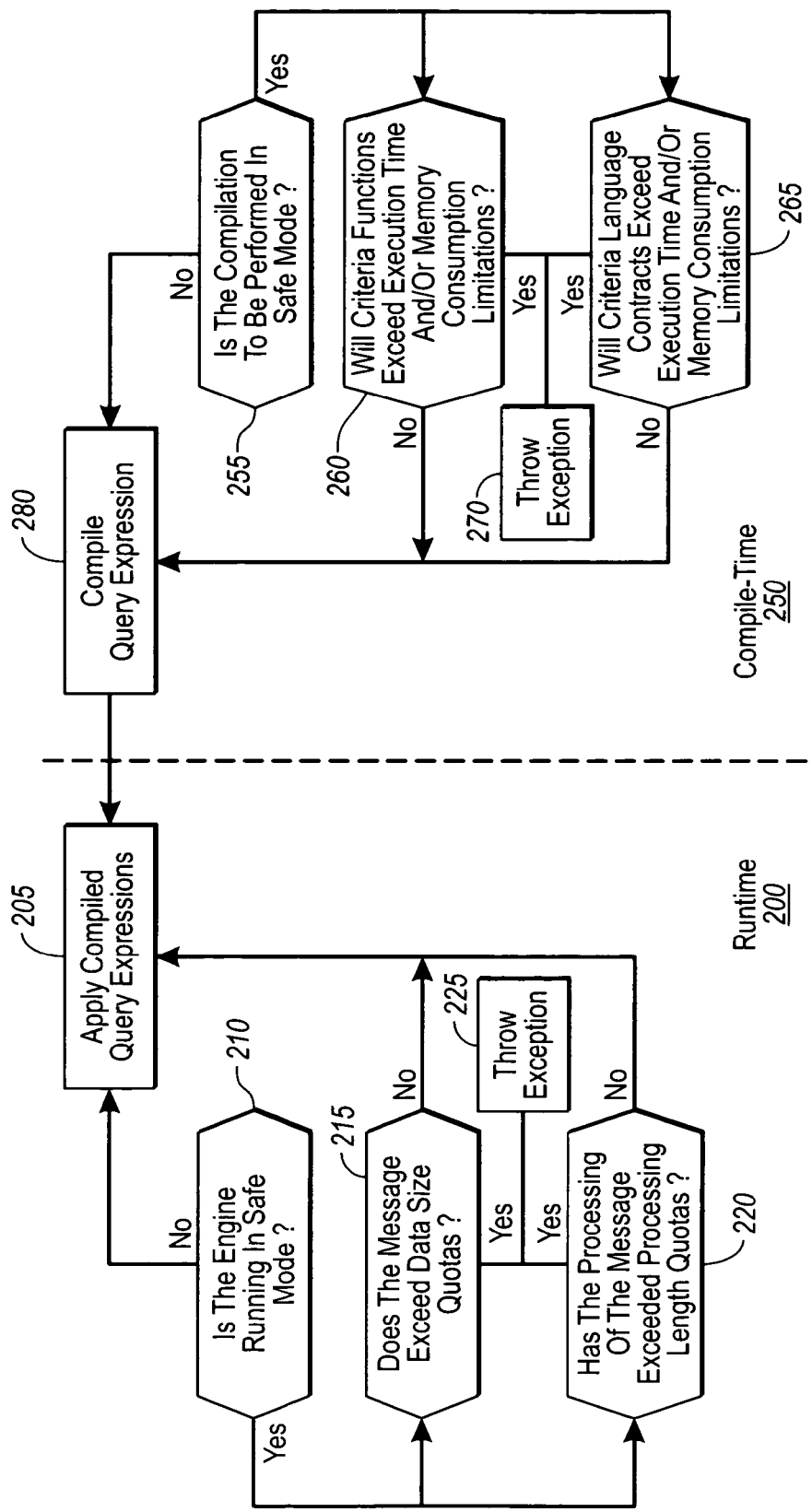
FIG. 2 illustrates a flowchart of runtime evaluations of messages and compile-time evaluations of query expressions in accordance with example embodiments.

In any event, when the message 105 is received, the runtime evaluation module 170 (or other component) determines if the query engine 100 is running in safe mode, as shown in process 210 on the runtime side 200 of the flowchart in FIG. 2. If the runtime process 200 is not in safe mode, the message processor 110 applies the compiled query expressions 125 in the instruction tree 114 against the inputs 107 to produce query results 112, as shown by following the "No" path to process 205 in FIG. 2. If on the other hand, the message 105 is to be processed in a safe mode, then the runtime evaluation module 170 is activated to monitor the runtime process 200 for ensuring that the evaluation does not overly consume processing time and/or memory resources.

More specifically, the runtime evaluation module 170 gathers runtime data from the message processor 110. This data is then compared against runtime quotas 175 retrieved from quota store 180, wherein the quotas 175 define various thresholds of tolerable limits for processing the message 105 in terms of data size and/or processing lengths. For example, the runtime evaluation module 170 determines if the message 105 exceeds the data size quotas 175 (as shown in process 215) and/or determines if the processing of the message 105 exceeds the processing length quotas 175 (as shown in process 220). If neither of these events occurs, the message 105 continues to be processed by applying the compiled query expressions 125, as shown by following the "No" paths in the flow diagram for processes 215 and 220. On the other hand, if any of the runtime quotas 175 are exceeded, a violation may be signaled, such as an exception may be thrown to exception handler 155, as shown in process 225 by following "Yes" paths of either process 215 or 220. (Note that embodiments as herein described use the terms "throwing an exception" and the like to broadly mean any type of indication that a violation has occurred.)

Note that if a violation is indicated, e.g., by throwing an exception, exception handler 155 (or other device as the case may be) can cause any number of events to occur. For example, the exception handler 155 may abort the processing of the message 105, alert system administrators of a possible attack, discard the message, identify who created the message, and/or take some other form of action. In one embodiment, the exception handler 155 allows the processing of the message 105 to continue, however, looks for other exceptions to be raised based on other runtime quotas 175 being violated. In other words, the embodiments herein allow for a combination of violations of runtime quotas 175 before it is determined that an attack is occurring. This feature may be useful in the event that a message 105 only barely exceeds a quota 175 and/or includes violations that are considered minor relative to other quotas 175. Nevertheless, it may be the overall combination of several minor violations that determine that a possible attack is occurring.

In any event, as previously mentioned the runtime quotas 175 define the tolerable thresholds in terms of data size and/or processing lengths. For example, one quota 175 may limit the data size of the message 105 and/or inputs 107, while another may limit the total number of inputs 107 in the message or a total number of sub-inputs for a particular input 107. Alternatively, or in conjunction, a data size quota 175 may limit the total bytes of the message 105 and/or the total number of allowable characters in an input 107. In this latter example, the message 105 and/or inputs 107 may be limited by a string length of the concatenation of the inputs 107 and/or sub-inputs for a particular input 107. In other words, the total message 105 and/or individual inputs 107 may be concatenated into string lengths, which can then be compared with allowable threshold values in the runtime quotas 175.

Other runtime quotas 175 define tolerable thresholds in terms of processing lengths. For example, one processing length quota 175 may limit the duration for processing the entire message 105 or any portion thereof. For example, the overall process time may be monitored, as well as processing time for individual inputs 107. In another example embodiment, the processing length quota 175 includes threshold value(s) for node counts. More specifically, a navigator (not shown) is used to iterate over the message 105 and exposes the message 105 as a tree like data structure (e.g., a document object model (DOM)), similar to the instruction tree 114. Every node that the navigator moves to, or past, may be counted. When the count exceeds the node quota 175, a violation is signaled, e.g., by throwing an exception 225 to the exception handler 155.

Note that in the above node quota 175, the count may be an overall node count for the entire message, or it may be based on the node count for one or more individual input paths within the data structure. For example, every node move operation may cause the node count to increment. In another embodiment, however, the node count resets as each path is traversed. In the case where paths are merged, when a branch within the data structure (e.g., the DOM) is reached, the node count up to that branch may be saved. As the navigator moves to evaluate the merged paths from the point of the branching node, it will use this saved node count and increment the count of the other paths from that point on. For example, if the navigator reaches a branch at a node count of 23, and then continues to move down a first path that has a total count of 55. When the navigator moves back to the branching node to evaluate other paths, rather than continuing the node count at 55, the node count starts over at 23. Note, however, that the node count may be based on a cumulative node quota of one or more input paths.

Note also that the above described quotas 175 are configurable and extensible based on any number of factors. For example, the quotas 175 are not limited to just those quotas described above with reference to data size and processing duration. Further, the number of quotas 175 used, the threshold limits, and other values are adjustable on either a static or dynamic basis. For instance, in the case where a message is received by an unreliable third party, the quotas 175 may be dynamically adjusted based on an unreliability confidence level of the message 105 as defined by historical data about other messages 105 received from the third party. In other words, as messages 105 are continually received from a third party that are not considered attacks on the system, good will may be granted such that the restrictions from the quotas 175 are eased for messages 105 received from this source. Similarly, messages 105 received from trusted parties may have lesser threshold values set than messages 105 received from unreliable sources. In fact, the threshold values for the runtime quotas 175 may be dynamically or statically adjusted based on any other number of factors. Accordingly, the above examples for dynamically or statically adjusting the quotas 175 are used for illustrative purposes only and are not meant to limit or otherwise narrow the scope of embodiments described herein.

As previously mentioned, other example embodiments provide for compile-time mitigations. Accordingly, the following discussion will make reference to the compile-time components 150 in FIG. 1 and the processes on compile-time side 250 of the flowchart in FIG. 2. As shown in these figures, a query expression 125 may be received over a communication channel, or it may be accessed from memory, storage, e.g., query store 135. In accordance with one embodiment, the query expression 125 may be received by an unreliable source such as a third party; however, that need not be the case. Each query expression 125 will have associated therewith criteria 130 that can be applied against message inputs for determining the query results 112 (e.g., where the message is to be sent for further processing) as previously described. Before the query expressions are compiled, however, complexity evaluation module 120 may be used to determine whether the query expressions 125 should be compiled for evaluating the criteria 130 against the messages 105.

For example, when the query expressions 125 are received, the complexity evaluation module 120 (or other component) determines if the compilation of the query expressions 125 are to occur in safe mode, as shown in process 255 on the compile-time side 250 of the flowchart in FIG. 2. If the compilation process 250 is not in safe mode, the query expressions 125 are forwarded to compiler 115 for compilation, as shown by following the "No" path to process 280 in FIG. 2. If on the other hand, the compilation is to be performed in a safe mode, then the complexity evaluation module 120 is activated to ensuring that the evaluation of messages 105 does not overly consume processing time and/or memory resources.

More specifically, the complexity module 120 iterates over the criteria 130 of the query expressions 125 for determining the complexities thereof in terms of criteria functions and/or language constructs. The determined criteria 130 complexities are then compared against complexity limitations 145 retrieved from complexity store 140, wherein the complexity limitations define the reliability of criteria 130 in terms of potential execution time and/or memory consumption. For example, the complexity evaluation module 120 determines if the criteria 130 functions may exceed execution time and/or memory consumption limitations (as shown in process 260). Alternatively, or in conjunction, the complexity module 120 determines if the criteria 130 language constructs may exceed execution time and/or memory consumption limitations (as shown in process 265). If neither of these events can occur, the query expressions 125 are compiled by compiler 115, as shown by following the "No" paths in the flow diagram for processes 260 and 265. On the other hand, if any of the complexity limitations 145 are meet, a violation is signaled by, e.g., throwing an exception to exception handler 155, as shown in process 270 by following "Yes" paths of either process 260 or 265.

Note that if an exception is thrown (or other violation indication is made), similar to the case above with regards to the runtime process 200, exception handler 155 may cause any number of events to occur. For example, the exception handler 155 may abort the compilation, discard the query expression 125, alert system administrators, identify the party that created the query expression 125, and/or take some other form of action. In one embodiment, the exception handler 155 does not abort the compilation and/or discard the query expression 125, however, it looks for other exceptions to be raised based on other violations of complexity limitations. In other words, the embodiments herein allow for a combination of violations before it is determined that a query expression 125 will not be compiled.

In any event, as previously mentioned the complexity limitations 145 define the reliability of criteria 130 in terms of potential execution time and/or memory consumption. For example, the complexity limitations 145 may restrict the criteria language in terms of functions described therein. For instance, the functions that may be restricted may include functions that have, or do, the following: non-linier runtimes; non-constant memory usage; or can create large strings. Such functions represent possible DoS attacks due to how quickly they can consume resources. Alternatively, or in conjunction, the complexity limitations 145 may restrict criteria in terms of language constructs. For example, the nested predicates or predicates that have any restricted function may be prohibited.

Other embodiments provide that the complexity limitations 145 further define the reliability of criteria 130 in terms of node-set operations. For example, equality and relational operators that search for nodes in a node-set that satisfy the relation potentially produce lengthy runtimes. As such, they may be restricted. Also, union operators that return the resulting node-set sorted into document order can potentially cause problems if implemented inefficiently; and therefore may be limited from criteria 130.

Note that the above complexities for criteria 130 (and/or the complexity limitations) may be defined in terms of order statistics. As such, an ordered statistic can be assigned to each function, language construct, or combination thereof with operators, and such complexity values compared with complexity limitations 145. For example, if "n" is the maximum node count and "m" is the number of characters allowed in a string, it may be determined that functions, language constructs, or operators that cause runtimes and/or memory consumptions of $O(m)$, $O(m^2)$, $O(n^2)$, $O(mn)$, $O(n^2)$, $O(nm^2)$, or greater should be restricted. As such, the complexity limitations 145 can be simply defined in terms of order statistic limitations and the criteria 130 can be scanned looking for functions, language constructs, and/or node-set operations that cause the limitation. The actual order statistics for the criteria 130 will typically vary with implementation. Note, however, that the above list of ordered statistics are not the only ones available to the embodiments herein described, but are used as examples of possible complexity limitations 145.

In one embodiment, the query expressions 125 are XPath queries. XPath is a functional language for representing queries that are often evaluated against XML documents. During conventional evaluation of inverse query paths (such as XPath statements) against XML documents, there is significant looping in order to fully navigate the XML document. As such, nested predicates such as "//*[/*[/*[/*]]]" may be restricted based on the complexity limitations 145. Other XPath expressions that may cause large runtimes and/or memory may include those with any of the following functions: contact( ); contains( ); translate( ); string( ); substring( ); substring-before( ); substring-after( ); normalize-space( ); sum( ); and others. Accordingly, these expressions may be included in the complexity limitations 145 when the query engine 100 is an XPath engine.

Note, however, that the complexity limitations 145 may include other XPath functions, language constructs, and/or operators not herein listed. For example, the string( ) function should include any implicit conversions from node-set to string. In addition, the present invention contemplates the use of custom functions that may be used, but may limit such functions to only those whose runtime and memory consumption are known and be controlled. As such, the above example XPath criteria are used herein for illustrative purposes only and are not meant to limit or otherwise narrow the scope of embodiments herein unless explicitly claimed.

Also note that similar to the runtime quotas 175, the above described complexity limitations 145 are configurable and extensible based on any number of factors. For example, the complexity limitations 145 used, the threshold limits set, and/or other values are adjustable on either a static or dynamic basis. For instance, in the case where a query expression 125 is received by an unreliable third party, the complexity limitations 145 may be dynamically adjusted based on an unreliability confidence level of the query expression 125 as defined by historical data about other query expressions 125 received from the third party.

In other words, as query expressions 125 are continually received from a third party that include criteria 130 that are not considered attacks on the system, good will may be granted such that the restrictions from the complexity limitations 145 are eased for query expressions 125 received from this source. Similarly, query expressions 125 received from trusted parties may have lesser restrictions set than query expressions 125 received from unreliable sources. In fact, the complexity limitations 145 may be dynamically or statically adjusted based on any other number of factors, for instance the composite complexity of all the criteria 130 within the query expression 125. Accordingly, the above examples for dynamically or statically adjusting the complexity limitations 145 are used for illustrative purposes only and are not meant to limit or otherwise narrow the scope of embodiments described herein.

Other adjustments for the complexity limitations 145 are also available in terms of the runtime quotas 175. For example, in the case that the query expressions 125 are XPath expressions and the node and/or string quotas 175 are enforced, sum( ), string( ), and concat( ) may not need to be excluded. Accordingly, the adjustments for the complexity limitations 145 can be dynamically or statically made depending on these and other similar considerations for the runtime quotas 175 that will be enforced.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts is the recitation of the claims—and in the following description of the flow diagrams for FIGS. 3 and 4—is used to indicate the desired specific use of such terms.

As previously mentioned, FIGS. 3 and 4 illustrate flow diagrams for various exemplary embodiments of the present invention. The following description of FIGS. 3 and 4 will occasionally refer to corresponding elements from FIGS. 1 and 2. Although reference may be made to a specific element from these figures, such references are used for illustrative purposes only and are not meant to limit or otherwise narrow the scope of the described embodiments unless explicitly claimed.

FIG. 3 illustrates a flow diagram of a method 300 of mitigating attacks on an inverse query when evaluating messages against query expressions executed in a runtime safe mode. Method 300 includes an act of receiving 305 a message. For example, inverse query engine 100 may receive a message 105 that includes input(s) 107 used in runtime evaluation 200 of the message 105 against query expressions 125 for determining if the input(s) satisfy the criteria 130 thereof. More specifically, message processor 110 may receive message 105 and apply the instruction tree 114 against the inputs 107. When applied the instruction tree 107, which is a data structure of the criteria 130 for compiled query expressions 125, produces query results 112. Note that the message 105 may be received by a third party and/or may be an XML document.

In any event, as shown in FIG. 3, method 300 also includes a step for determining 325 if an exception (or other violation indication) will be thrown during runtime evaluation of a message. Step for 325 includes an act of monitoring 310 the runtime evaluation of the input(s). For example, runtime evaluation module 170 may monitor the runtime evaluation 200 of the input(s) 107 for collecting runtime data used in determining if the evaluation 200 overly consumes processing time, memory resources, or both. Further, step for 325 includes an act of accessing 315 runtime quota(s). For example, during the monitoring of the evaluation of message 105, runtime evaluation module 170 may access runtime quota(s) 175 from quota store 180, which define a threshold of tolerable limits in terms of data size, processing lengths, or both.

Note that the runtime quota(s) 175 defined by the processing lengths may include processing duration for the message 105, a node count for the runtime evaluation 200, or both. In addition, the runtime quota(s) 175 defined by the data size may include a limitation of a data size of the message 105, data size of one or more inputs 107, or both. More specifically, the data size of the message may limit the number of inputs 107 in the message 105, the number of total bytes in the message 105, or both, and the data size of the inputs 107 may limit the number of sub-inputs of the inputs 107, the number of characters in the inputs 107, or both. For example, the data size of the inputs 107 may be limited by a string length of the concatenation of the sub-inputs.

Regardless of the type of runtime quota 175, step for 325 further includes an act of comparing 320 the runtime data against the one or more runtime quota(s). For example, runtime evaluation module 170 may compare the runtime data collected against the runtime quota(s) 175 for determining if an exception (or other violation indication) will be thrown based on runtime data value(s) that exceed the threshold limits of the runtime quota(s) 175. In one embodiment, the message 105 may be considered unreliable and an exception is thrown 270 to the exception handler 155 that causes terminating the evaluation, raising an alert to a system administrator, etc.

Note that another embodiment provides that the runtime quotas 175 are configurable. Further, another embodiment provides that if the message 105 is received by a third party, the runtime quotas 175 may be dynamically adjusted based on an unreliability confidence level of the message 105 as determined by historical data about other messages 105 received from the third party.

FIG. 4 illustrates a flow diagram of a method 400 of evaluating the reliability of the query expression by comparing complexities of the criteria against acceptable limitations when compiling the query expression in a safe mode. Method 400 includes an act of receiving 405 a query expression. For example, complexity evaluation module may receive query expression 125 that include criteria 130 for applying against inputs 107 of messages 105. Method 400 also includes step for determining 420 whether a query expression should be compiled. More specifically, prior to compiling the query expression, step for 420 includes an act of determining 410 the complexities of the criteria. For example, when compiling in safe mode, complexity evaluation module 120 may determine the complexities of the criteria 130 for the query expressions 125 in terms of criteria 130 functions, language constructs, or both.

Further, step for 420 includes an act of comparing 415 the complexities of the criteria with complexity limitations. For example, complexity evaluation module 120 may retrieve the complexity limitations 145 in complexity store 140, which define the reliability of criteria 130 in terms of execution time, memory consumption, or both. These complexity limitations 145 may then be compared with complexities of the criteria 130, wherein based on the comparison it is determined whether the query expression(s) 125 should be compiled for evaluation against the inputs 107 of the messages 105.

Note that the complexity limitations 145 may further define the reliability of criteria 130 in terms of operators that combine the criteria functions, language constructs, or both. Further, the complexity limitations 145 may further defines the reliability of criteria 130 in terms of node-set operations that search for node-set equality, relations, or both. Moreover, the complexity limitations 145 may further defines the reliability of the criteria 130 in terms of union operators, which form a union of two node-sets. Still other embodiments provide that the complexity limitations 145 may define the reliability of the criteria 130 in terms of functions that have, or do, one or more of the following: non-linear runtimes; non-constant memory usage; or create large strings. In another embodiment, the language constructs may include one or more of the functions. While other embodiments provide that the complexity limitations 145 do not allow the language constructs to have nested predicates.

As previously mentioned, the query expression may be received from a third party. In such case, example embodiments provide that the complexity limitations 145 may be dynamically adjustable based on a degree of trust for the third party. In another embodiment, the complexity limitations 145 are adjustable based on the composite complexity of all functions and language constructions within the query expression 125.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At computer system, the computer system including a processor, the computer system also including an inverse query engine configured to evaluate messages against query expressions, a method of mitigating Denial Of Service ("DOS") attacks against the inverse query engine, the method comprising:

tuning one or more thresholds for use in a runtime safe mode to provide a desired level of safety for the inverse query engine that balances permitted query expression functionality against the susceptibility of the inverse query engine to Denial of Service ("DOS") attacks;

receiving a message from a third party, the message including a plurality of message inputs used in runtime evaluation of the message against query expressions, wherein each query expression include a series of queries that comprise one or more conditions, criteria, or rules that must be satisfied by one or more inputs for a query to evaluate to true, and wherein the runtime evaluation of the message determines which of the message inputs satisfy at least one of the query expressions;

the processor dynamically adjusting the tuned one or more thresholds based on a known reliability of the third party, the known reliability based on historical data about the monitoring of other messages receives from the third party;

initiating runtime evaluation of the message inputs against the query expressions to produce query results;

a runtime evaluation module externally monitoring the ongoing runtime evaluation of message inputs against the query expressions to detect a DOS attack on the inverse query engine, including:

accessing a portion of query results;

comparing the query results against the dynamically adjusted tuned one or more thresholds; and based on the comparison, the processor determining that the accessed portion of query results has caused at least one of the dynamically adjusted tuned one or more thresholds to be exceeded;

in response to determining that at least one of the dynamically adjusted tuned one or more thresholds has been exceeded:

indicating a violation with respect to the received message; and stopping the inverse query engine from further evaluating the message against the query expressions.

2. The method of claim 1, wherein the one or more thresholds define processing lengths including processing duration for the message, a node count for the runtime evaluation, or both.

3. The method of claim 1, wherein the one or more thresholds define data size including a limitation of a data size of the message, data size of one or more inputs, or both.

4. The method of claim 3, wherein the data size of the message limits the number of inputs in the message, the number of total bytes in the message, or both, and the data size of the one or more inputs limits the number of sub-inputs of the one or more inputs, the number of characters in the one or more inputs, or both.

5. The method of claim 4, wherein the data size of the one or more inputs is limited by a string length of the concatenation of the sub-inputs.

6. The method of claim 1, wherein the one or more thresholds are configurable.

7. The method of claim 1, wherein the inverse query engine is an XPath engine and the message is an XML document.

8. A computer program product for use at a computer system, the computer system including an inverse query engine to evaluate messages against query expressions the computer program product for implementing a method of mitigating Denial of Service ("DOS") attacks against the inverse query engine, the computer program product comprising one or more computer storage devices having stored thereon computer-executable instructions that, when executed at a processor, cause the computer system to perform the method including the following:

tune one or more thresholds for use in a runtime safe mode to provide a desired level of safety for the inverse query engine that balances permitted query expression functionality against the susceptibility of the inverse query engine to Denial of Service ("DOS") attacks;

receive a message from a third party, the message including a plurality of message inputs used in runtime evaluation of the message against query expressions, wherein each query expression include a series of queries that comprise one or more conditions, criteria, or rules that must be satisfied by one or more inputs for a query to evaluate to true, and wherein the runtime evaluation of the message determines which of the message inputs satisfy at least one of the query expressions;

dynamically adjust the tuned one or more thresholds based on a known reliability of the third party, the known reliability based on historical data about the monitoring of other messages receives from the third party;

initiate runtime evaluation of the message inputs against the query expressions to produce query results;

externally monitor, at a runtime evaluation module, the ongoing runtime evaluation of message inputs against the query expressions to detect a DOS attack on the inverse query engine, including:

access a portion of the query results;

compare the query results against the dynamically adjusted tuned one or more thresholds; and based on the comparison, determine that the access portion of query results has caused at least one of the dynamically adjusted tuned one or more thresholds to be exceeded;

in response to determining that at least one of the dynamically adjusted tuned one or more thresholds has been exceeded:

indicate a violation with respect to the received message; and stop the inverse query engine from further evaluating the message against the query expressions.

* * * * *